United States Patent [19]

Albert, Jr.

[11] Patent Number: 4,501,511
[45] Date of Patent: Feb. 26, 1985

[54] BALL TYPE UNIVERSAL JOINT AND METHOD OF MANUFACTURE

[75] Inventor: Frank Albert, Jr., Parma, Ohio

[73] Assignee: Preformed Marine, Inc., Cleveland, Ohio

[21] Appl. No.: 267,078

[22] Filed: May 26, 1981

[51] Int. Cl.³ ............ F16D 1/12; F16D 3/24; F16C 11/06
[52] U.S. Cl. .................. 403/24; 403/114; 174/74 R; 464/141
[58] Field of Search ............ 403/38, 52, 57, 76, 403/122, 124, 125, 126, 275, 24, 114; 464/139, 141, 906, 15; 174/74 R, 79

[56] References Cited

U.S. PATENT DOCUMENTS

| | | | |
|---|---|---|---|
| 927,391 | 7/1909 | West | 464/141 |
| 1,048,213 | 12/1912 | Sappington et al. | 464/141 X |
| 1,463,306 | 7/1923 | Bushnell | 464/141 |
| 1,622,425 | 3/1927 | Dwyer | 464/141 |
| 1,665,280 | 4/1928 | Rzeppa | 464/906 X |
| 1,763,206 | 6/1930 | Woveris | 464/141 |
| 1,838,310 | 12/1931 | Hubbel | 464/141 X |
| 1,847,677 | 3/1932 | Sternbergh | 464/15 X |
| 2,308,281 | 1/1943 | Steele | 172/551 |
| 2,397,164 | 3/1946 | Shafer | 308/72 |
| 3,361,458 | 1/1968 | Herbenar | 403/38 X |
| 3,982,840 | 9/1976 | Grosseau | 403/14 |
| 4,189,620 | 2/1980 | Stange | 403/275 X |

FOREIGN PATENT DOCUMENTS

| | | | |
|---|---|---|---|
| 602472 | 3/1960 | Italy | 464/141 |
| 270795 | 5/1927 | United Kingdom . | |
| 408660 | 4/1934 | United Kingdom . | |
| 577212 | 5/1946 | United Kingdom | 464/141 |
| 863378 | 3/1961 | United Kingdom . | |
| 2019531 | 10/1979 | United Kingdom . | |
| 2044884 | 10/1980 | United Kingdom . | |
| 1599204 | 9/1981 | United Kingdom . | |

*Primary Examiner*—Stuart S. Levy
*Assistant Examiner*—Daniel P. Stodola
*Attorney, Agent, or Firm*—Fay & Sharpe

[57] ABSTRACT

A ball type universal joint construction where a ball member is rotatably received in a housing and a bearing structure interposed therebetween in a manner which limits the relative rotational degrees of freedom. The ball member has a spherical surface portion which includes axially extending bearing receiving slots and the housing has a cavity spherical surface portion which includes bearing receiving recesses in registry with the receiving slots. Ball type bearings disposed partially within the recesses and partially within the slots limit movement between the ball member and housing to articulated movement relative to each other. The housing also includes an access opening at one end face having an enlargement through which the ball member can be passed when rotated 90 degrees to its nominal, functioning position. This allows the ball member to be inserted into the housing through the enlargement while at the same time accommodating passage of the bearings into the housing recesses. Thereafter, the ball member is further rotated such that the receiving slots also partially receive the bearings and thus capture the ball member in an articulating, non-rotatable relationship in the housing.

2 Claims, 14 Drawing Figures

BALL TYPE UNIVERSAL JOINT AND METHOD OF MANUFACTURE

BACKGROUND OF THE INVENTION

This application pertains to the art of joint constructions and more particularly to universal joint constructions which inhibit relative rotation between the joint components about their longitudinal axes while permitting rotation about axes transverse to the longitudinal axes. Such permitted rotation is hereinafter referred to as articulation.

The invention is particularly applicable to a ball type universal joint used at terminals for transmission cables or the like where the cables are allowed to articulate or move but not rotate about their longitudinal axes relative to the structures from which they are suspended. It will be appreciated, however, that the invention has numerous other applications including, for example, flexible power transmission connections, marine antenna connectors, drive shafts, universal joints, socket wrench joints, overhead hoist joints, and the like.

Ball type universal joints are well known and generally include an inner ball element adapted for fixed connection to some associated structure. Typically, the ball member is received in a central cavity of a housing which is connected to some second associated structure. In some constructions, a race of ball bearings rotatably secured in a cage or other bearing retaining means is disposed a gap between the ball member and housing cavity. Each ball bearing is partially received in a slot in the ball member and in a matching slot in the housing. These slots have widths commensurate with the ball bearing diameters and lengths generally disposed axially of the joint. The cooperative association between the ball bearings and slots blocks or prevents relative rotation between the ball member and housing about their longitudinal axes while readily permitting articulated movement therebetween. The cage or other retaining means is necessary for maintaining the ball bearings operatively interposed between the housing and ball member and for preventing undesired disassociation of the bearings from the joint construction.

Prior art ball type universal joints such as the construction described above generally require careful match-machining. Also, assembly thereof into a finished joint tends to be time consuming and difficult owing to the large number of components, particularly the ball bearings, which are involved.

It has, therefore, been considered desirable to develop a new and improved joint construction and method of manufacture which would overcome the foregoing problems. The present invention is deemed to meet these needs and others in providing a new ball type universal joint which is easy to manufacture and assemble in a wide variety of sizes for practical application in many different environments.

SUMMARY OF THE INVENTION

In accordance with the present invention, there is provided a universal joint construction which permits relative articulating movement and inhibits relative rotational movement between the joint components and thus, the associated structures which it connects. The joint includes a ball member having an exterior surface portion which lies substantially on the surface of a first sphere. The ball member is adapted to be fixedly interconnected with a first associated structure. The joint also includes a housing which has an axial cavity with an interior surface portion which lies substantially on the surface of a second sphere for rotatably receiving the ball member. The housing is adapted to be interconnected with a second associated structure. At least one bearing receiving recess is disposed in and substantially surrounded by the spherical surface portion of one of the ball member and housing cavity with a corresponding bearing receiving slot being disposed in the other. A bearing element is operatively interposed between the ball member and housing, being partially disposed in the recess and partially in the slot. In this manner, the bearing element acts to limit relative movement between the ball member and the housing to orientations in which the slot and recess register or overlap.

According to a preferred construction of the invention, the width of the slot and the width of the recess are closely compatible with the width of the bearing element and the slot is disposed axially of the joint. Relative rotation between the ball member and the housing is thus prohibited while articulating movement is freely permitted.

In accordance with another aspect of the present invention, a method of assembly for a ball type universal joint construction is provided. The joint itself includes a ball member having a ball spherical surface portion and opposed end faces laterally spaced apart from each other by a distance less than the diameter of the ball spherical surface portion. A housing includes an interior cavity having a cavity spherical surface portion with the cavity and ball spherical surface portions adapted for rotational mating engagement with each other. The cavity terminates in an access opening having an enlargement dimensioned for ball member passage therethrough. At least one bearing receiving recess is disposed in one of the cavity and ball spherical surface portions and a bearing receiving slot is disposed in the other portion. The method itself comprises: (a) inserting the ball member through the access opening enlargement into the housing cavity; (b) placing a bearing partially in the receiving recess; and, (c) rotating the ball member such that the bearing is also partially received in the receiving slot. When the joint construction is placed into use, the bearing facilitates free articulating movement between the ball member housing while preventing relative rotation therebetween. At the same time, inadvertent joint disassembly is prevented.

The principal object of the present invention is the provision of a new universal joint and method for manufacturing same.

Another object of the invention resides in a new ball type universal joint construction and method which are readily adapted to a wide variety of joint applications.

Other objects and advantages for the invention will become apparent to those skilled in the art upon a reading and understanding of the following specification.

BRIEF DESCRIPTION OF THE DRAWINGS

The invention may take form in various parts and arrangements of parts and in various steps or sequences of steps. The accompanying drawings are for purposes of illustrating preferred and alternative embodiments of the invention only and are not to be taken as limiting same wherein.

DESCRIPTION OF THE PREFERRED EMBODIMENTS

Figure 1:
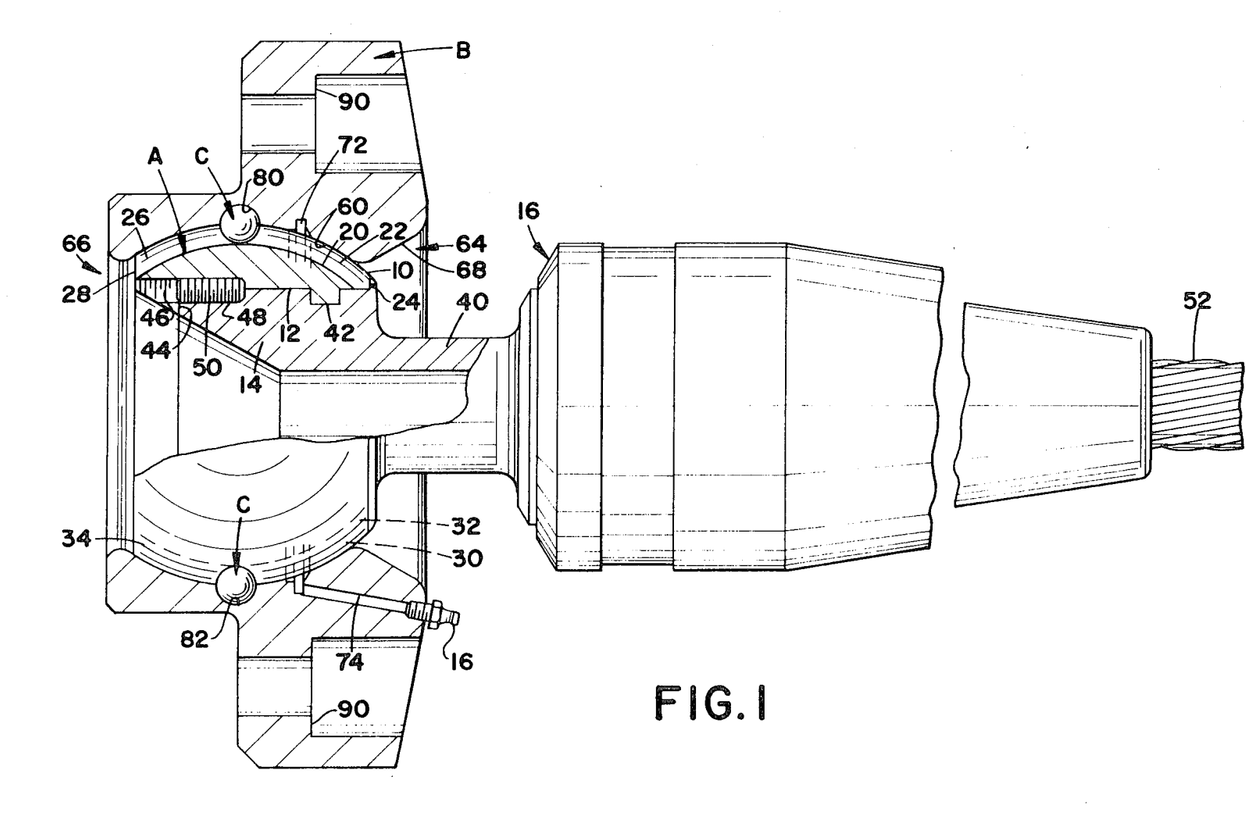
FIG. 1 illustrates in partial cross-section a preferred embodiment of a universal joint in accordance with the present invention.

With reference to FIG. 1, the new universal joint construction includes a ball member A rotatably received in a housing B with a pair of bearings C being operatively interposed between the ball member A and the housing B to limit the rotational degrees of freedom therebetween.

Figure 2:
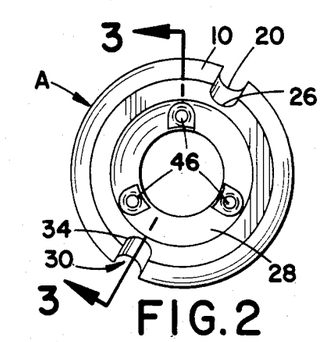
FIG. 2 is a rear view of the ball member of FIG. 1.
Figure 3:
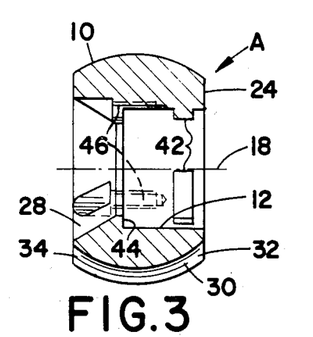
FIG. 3 is a cross-sectional view of the ball member taken generally along lines 3—3 of FIG. 2.
Figure 4:
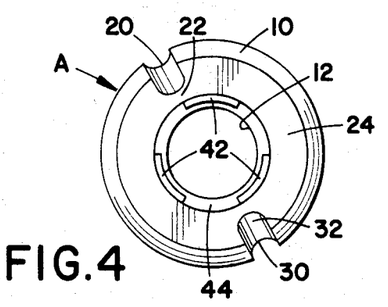
FIG. 4 is a front view of the ball member of FIG. 1.
Figure 5:
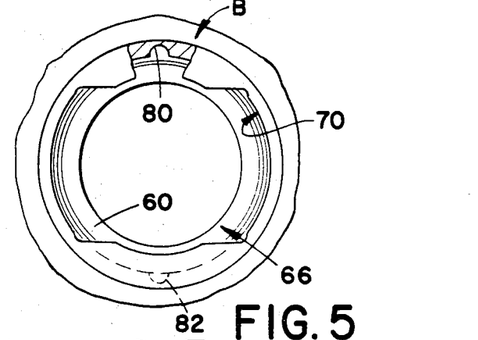
FIG. 5 is a partial rear view in partial cross-section of the housing of FIG. 1.
Figure 6:
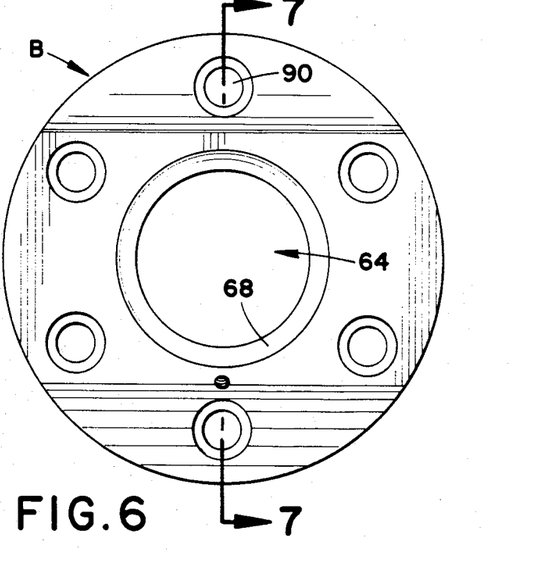
FIG. 6 is a front view of the housing of FIG. 1.
Figure 7:
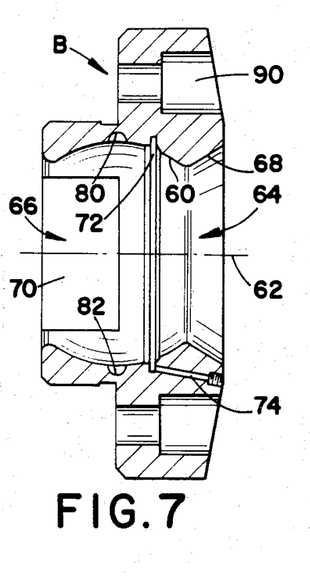
FIG. 7 is a cross-sectional view taken generally along lines 7—7 of FIG. 6.

Referring more specifically to the ball member A which is illustrated in greater detail in FIGS. 2, 3, and 4, it is generally toroidal in shape having an exterior surface portion 10 which lies on a first sphere. An inner passage 12 and a ball-associated structure interconnecting means 14 are adapted for interconnection with a first associated structure 16. A first ball member depression which, in the preferred embodiment, comprises a first slot 20 extending longitudinally or axially of ball member axis 18, is disposed in the spherical ball member surface portion 10. The slot 20 has a cross section which is configured to conform with the cross section of the bearing C, i.e., a semicircular trough. The slot 20 has a first end 22 adjacent a front face 24 of the ball member and a second end 26 adjacent a rear face 28 of the ball member. At least one of the first and second ends is sufficiently unrestricted that the ball member is able to be rotated along the slot until the bearing member and the slot disengage. Such disengagement during use is undesirable but as will be shown below, it facilitates joint assembly.

In the preferred embodiment, a second ball member depression in the form of a second slot 30 is disposed diametrically opposite the first slot 20. The second slot 30 has similar opposed ends 32 and 34 with at least one being substantially unrestricted. Two slots which are 180 degrees apart are preferred, however, it is contemplated that the universal joint may have only a single slot. In the orientation illustrated in FIG. 1, the pair of diametrically opposed slots provide a path along which the pair of bearings C roll as the ball is rotated up or down along the plane of the paper. When the ball is rotated back and forth, i.e., in and out of the plane of the paper, the bearings restrict any radial motion between the ball and socket. When the ball is moved in other directions, a combination of these actions occurs.

In FIG. 1, the first associated structure 16 is shown as including a shaft 40 which is rigidly connected with the ball member A. The shaft 40 terminates at one end with shaft interconnecting means for interconnection with the ball interconnecting means 14. In the embodiment of FIGS. 1-4, the ball interconnecting means includes a plurality of spaced projections 42 which are received in corresponding slots on the shaft 40 to form a bayonet or twist type of connection. A rear ledge 44 is disposed adjacent the rear face 28 to limit longitudinal reception of the shaft. A means for locking the shaft and ball member against rotation includes a plurality of threaded bores 46 which extend through the rear ledge 44 and which cut partially into the side wall of inner passage 12. Matching partial bores 48 are cut into the shaft 40 such that set screws 50 are receivable in the bores to lock the shaft and ball member together. The ball and shaft interconnecting means may take any nunber of other forms or arrangements to accommodate use in a wide variety of environments. Such modifications do not, however, in any way depart from the overall intent or scope of the invention.

In the embodiment of FIG. 1, the first associated structure 16 comprises a cable termination device for securely interconnecting the joint construction with a cable 52. One such cable termination device is illustrated in, for example, U.S. Pat. No. 4,189,620, issued Feb. 19, 1980 to William F. Stange and assigned to the assignee herein. However, it is contemplated that many other types and styles of cable termination or interconnection devices may be satisfactorily utilized. Shaft 40 advantageously includes a central passage or bore 54 to facilitate the passage of electrical leads or the like (not shown) into communication with cable 52.

With reference to FIGS. 1, 5, 6, and 7, the housing B has a longitudinally or axially extending cavity for rotatably receiving the ball member. The cavity is defined in part by an interior surface portion 60 which lies substantially on the surface of a second sphere. The spherical cavity surface portion 60 is defined by a circular arc segment along the longitudinal axis 62 of the housing and a circular cross section transverse to the longitudinal axis. The length of the arc segment varies with the degree of relative movement or articulation between the shaft 40 and the housing B which is to be permitted. In the assembled condition, the first and second spheres are concentric and have radii which allow the ball to rotate easily within the cavity without excessive wobble or vibration. In the preferred embodiment, the difference in the radii is approximately 0.005 inches, although this will vary with the precision of the joint construction to be produced.

The housing cavity has a transverse front aperture 64 through which the shaft 40 projects and a transverse rear aperture 66. Adjacent the front aperture 64, the cavity has a limiting surface 68 which interacts with the surface of shaft 40 to limit the amount or degree of shaft articulation. The rear aperture 66 has an enlarged portion 70 which extends from the rear of the housing to the major diameter of the second spherical surface. This enlarged portion has a slightly greater width or cross section than the ball member A when disposed on its side to permit insertion of the ball member into the housing in a manner to be described. Also, the cavity spherical surface portion 60 has an annular channel 72 transversely therearound for carrying grease or lubricant to the interface betweeh the ball member A, the housing B, and the bearings C. A grease passage 74 connects the grease channel 72 with a grease fitting 76.

A first housing depression for receiving the bearing in the preferred embodiment is in the form of a first recess 80 and a second housing depression takes the form of a second bearing receiving recess 82. Recesses 80 and 82 are disposed in the cavity spherical surface portion 60 with the same circumferential spacing as the first and second slots 20 and 30, i.e., diametrically opposed. The recesses conform to the shape of the bearing C are, therefore, generally semispherical to restrain the bearings C between the housing and the ball member. Because each bearing C rotates within its associated recess as the ball member A is moved, it is desirable to minimize the frictional engagement between the recess and bearing. Therefore, and in addition to lubricants, various other means may be advantageously employed. The cavity spherical surface portion 60 and the recesses 80 and 82 are illustrated as being integral with the housing. Optionally, the cavity spherical surface portion 60 could be formed on a separate liner which is nonrotatably received within the housing B.

The bearings C in the preferred embodiment comprise spherical or ball bearings. A ball bearing is preferred because it has the widest freedom of rotational movement for reducing friction. However, because the ball member A and the housing B are not rotatable around the longitudinal axis, the bearings C are generally only called upon to restrict rotary motion so that elliptical or a cylindrical bearings could also be used. The bearings are received directly in the recesses 80 and 82 which simplifies assembly. However, the bearings may also comprise more complex subassemblies such as, for example, a cylindrical sleeve in which a biasing spring and a ball member are retained.

It will be appreciated, that the recesses and the slots may be reversed with the slots being formed in the housing B and the recesses being formed in the ball member A. It will further be appreciated that the length, width, and direction of the slots and the recesses determine the permitted degrees of freedom in the relative movement between the ball member A and the housing B. In the preferred embodiment, the slots extend longitudinally or axially with both the slots and recesses having transverse widths commensurate with the bearing diameters. The foregoing relationships prohibit relative rotation between the ball member and the housing about their longitudinal axes while permitting free relative movement or articulation about axes which are transverse to the longitudinal axis. If desired for some reason, a limited amount of rotational movement about the longitudinal axis can be introduced by increasing the transverse width of the slots. Further controlled combinations of articulation and rotation may be introduced by skewing the slots, by using nonlinear slots, by using enlarged recess, and the like.

The housing B includes housing-associated structure connecting means for connecting the housing with some second associated structure. In the embodiment of FIG. 1, this connecting means comprises a mounting flange having a plurality of circumferentially disposed bores 90 to accommodate fixedly bolting the housing to some other associated structure.

FIGS. 8 through 13 illustrate a method for assembling a ball type universal joint in accordance with the present invention. The ball type universal joint illustrated in FIGS. 8 through 13 is particularly adapted for transmitting rotational forces and torques, although it will be appreciated that the method of assembly is equally applicable to the embodiment of FIGS. 1 through 7. In the embodiment of FIGS. 8 through 13, like components are identified by like numerals with a primed (') suffix and new components are identified by new numerals.

Figures 8, 9, 10:
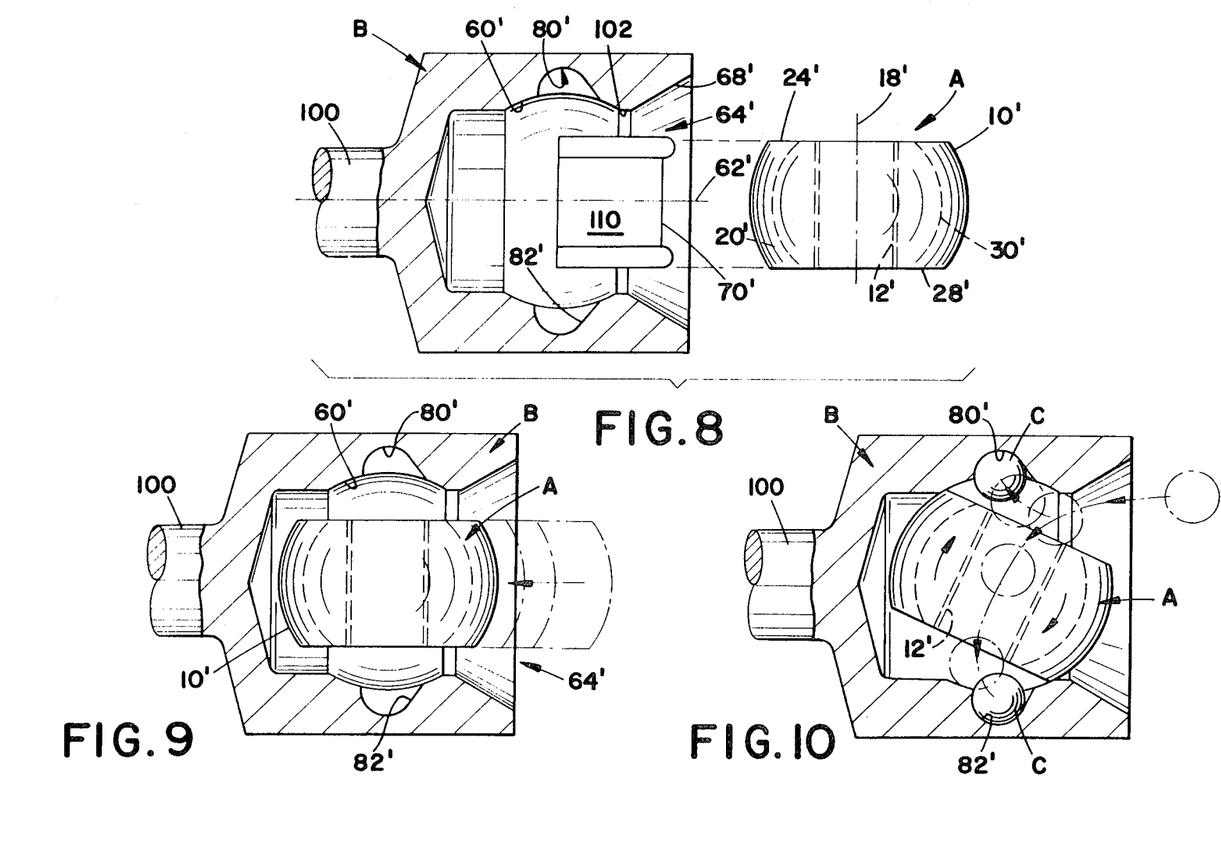
FIGS. 8 through 13 illustrate a preferred method of assembling for the universal joint construction formed in accordance with the present invention; and, FIG. 14 is an alternative embodiment of a universal joint construction in accordance with the present invention.

Referring to FIG. 8, the ball member A comprises a toroidal element having an exterior surface 10' which lies on the portion of a first sphere and a generally cylindrical splined inner passage 12' for receiving a shaft 40'. A pair of slots 20' and 30' which are recessed in the surface 10' extend from a front face 24' to a rear face 28'. The front and rear faces are disposed substantially parallel to each other and are laterally spaced apart by some distance which is less than the diameter of the spherical surface portion.

The second associated structure with which the housing B is connected is shown as comprising a shaft 100. The housing B has an internal cavity which has a cavity spherical surface portion 60' and a front aperture 64' for receiving the ball member A. A pair of recesses 80' and 82' are disposed in the cavity spherical surface portion 60' and are surrounded thereby. It will be appreciated that because the ball member spherical surface portion 10' and the cavity spherical surface portion 60' are very close to the same diameter, the edge of the cavity spherical surface portion which is adjacent the opening 64' will have a diameter which is smaller than the diameter of the ball spherical surface portion 10'. This relationship has caused assembly difficulties with prior art universal joint constructions and such difficulties have generally necessitated use of more complex joint constructions and assembly procedures.

In accordance with the subject invention, a new method of assembly for the above new universal joint is advantageously provided which allows the number of component parts to be reduced and facilitates ease of universal joint assembly. To that end, front aperture 64' in the housing B is provided with an enlarged portion 70'. This enlarged portion includes a pair of diametrically opposed slots, one of which 110 is visible in FIG. 8 and designated by numeral 110, extending longitudinally and parallel from the major diameter of the spherical cavity surface portion 60' toward the cavity front aperture 64'. In the preferred embodiment, the slots are disposed 90 degrees circumferentially around the longitudinal axis 62' from the recesses 80' and 82'. The enlarged portion 70' has a height which is slightly larger than the width between the front and rear faces 24' and 28' of the ball member A.

With reference to FIG. 9, the ball element A is rotated 90 degrees from its nominal installed position into alignment with the enlarged portion 70'. The ball member is slid through the enlarged portion until the spherical surface portions 10' and 60' abut.

With reference to FIG. 10, the ball member A is then rotated until sufficient clearance is provided between the ball member and the housing to allow bearings C to be passed therebetween. The bearings or the recesses 80' and 82' are coated with grease or other temporary adhesion means so that the bearings will adhere in the recesses. One bearing is passed between the ball member and the housing and pressed into the recess 80'. The second bearing is dropped through passage 12' of ball member A into the recess 82'. Optionally, the bearings C may be positioned in the recesses 80' and 82' before the ball member A is inserted into the housing.

Figures 11, 12, 13:
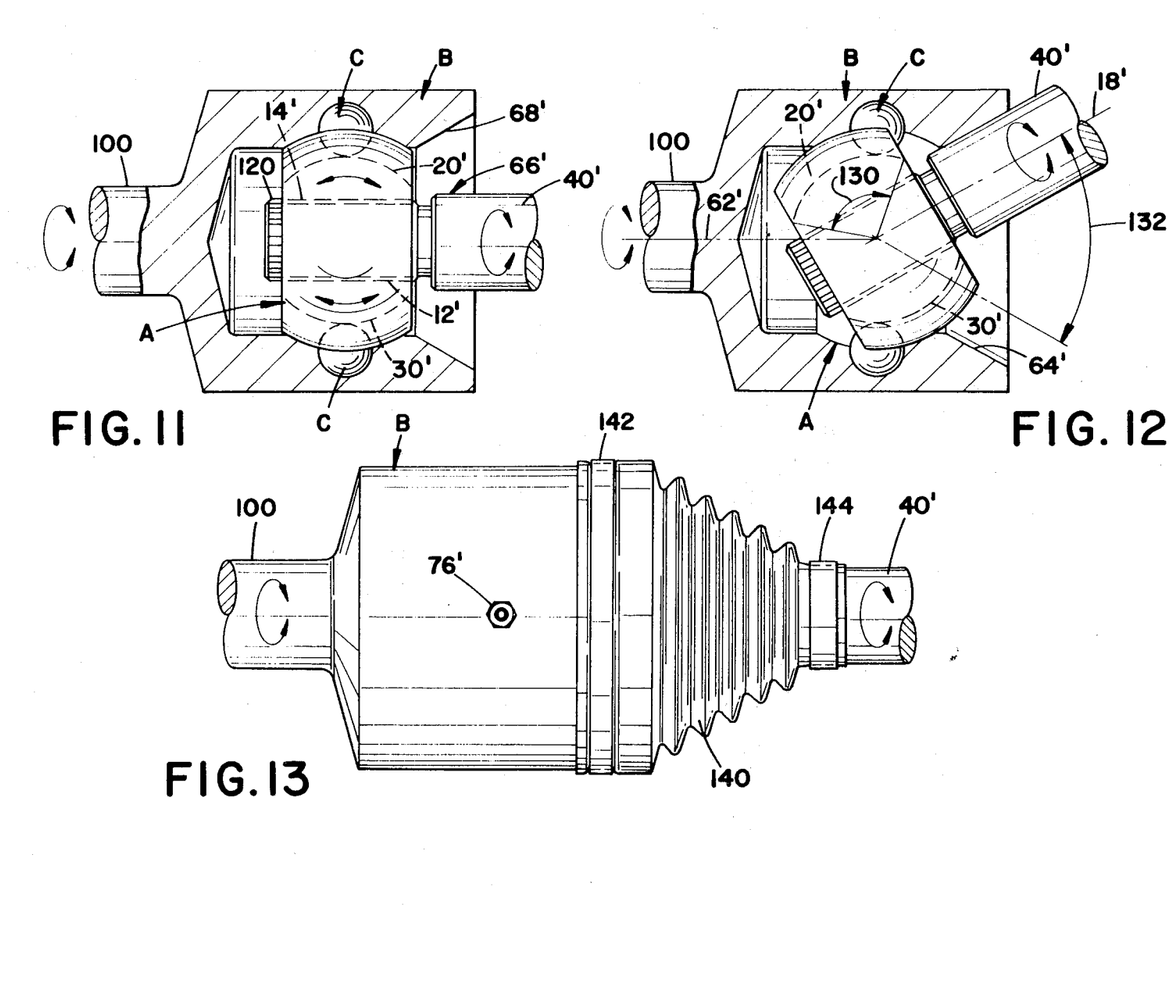

With reference to FIG. 11, and once the bearings are disposed in the recesses, the ball member A is rotated and its orientation adjusted until the bearings are received in the slots 20' and 30'. A splined end 120 of shaft 40' is inserted into the splined passage 12' of the ball member A. Optionally, the interconnecting means may further include a key member, set screw, bonding agent, or the like between the splined passage 12' and the splined end 120 to improve the security of their connection.

It will be appreciated that because the transverse width of the recesses 80' and 82' and the transverse width of the slots 20' and 30' are commensurate with the size of the bearings C and because the slots 20' and 30' extend axially of the ball member, the housing B and the ball member A, hence shafts 40' and 100, are locked against relative rotation about their axes 18' and 62', respectively. Rotational forces or torques applied to shaft 100 are thus conveyed through the housing B and bearings C to ball member A, through the splined interconnection of surfaces 12' and 120 to shaft 40'.

Referring to FIG. 12, the interaction of the slots 20' and 30' with the bearings C permit the shaft 40' and the ball member A to rotate about any axis transverse to the coaxial longitudinal axis of shaft 100 and housing B and to the longitudinal axis of shaft 40', i.e., an articulating type movement. The shaft 40' and ball member A are permitted to articulate until the surface of shaft 40' abuts the articulation limiting surface 68' of the housing. Rotational forces or torques about the longitudinal axis 62' of shaft 100 and housing B are transmitted through the joint and result in rotational forces or torques being applied about the longitudinal axis 18' extending through the shaft 40' and ball member A.

It will be appreciated that if the ball member A rotates too far relative to the housing B, the bearings C will be free to fall from the recesses 80' and 82'. Such an extreme articulated position would, for example, have the components disposed in the manner illustrated in FIG. 10. To prevent the bearings from leaving the recesses, and referring again to FIG. 12, the longitudinal arc segment 130 spanned by the slots 20' and 30' is greater than the arc segment 132 spanned by the maximum limits of articulation. In this manner, the surface of the shaft 40' and the articulation limiting surface 68' limit articulation of the ball member such that the bearings are always retained within the slots 20' and 30'.

FIG. 13 shows a grease fitting 76' connected with the housing B in communication with its interior cavity. This allows grease to be forced into the interface area between the cavity spherical surface portion and the ball member spherical surface portion to provide lubrication. A flexible, protective boot 140 is frictionally connected with bands 142 and 144 to the exterior surface of the housing B and the shaft 40'. The protective boot is advantageously accordion pleated to enable it to flex between the limits of articulation.

Figure 14:
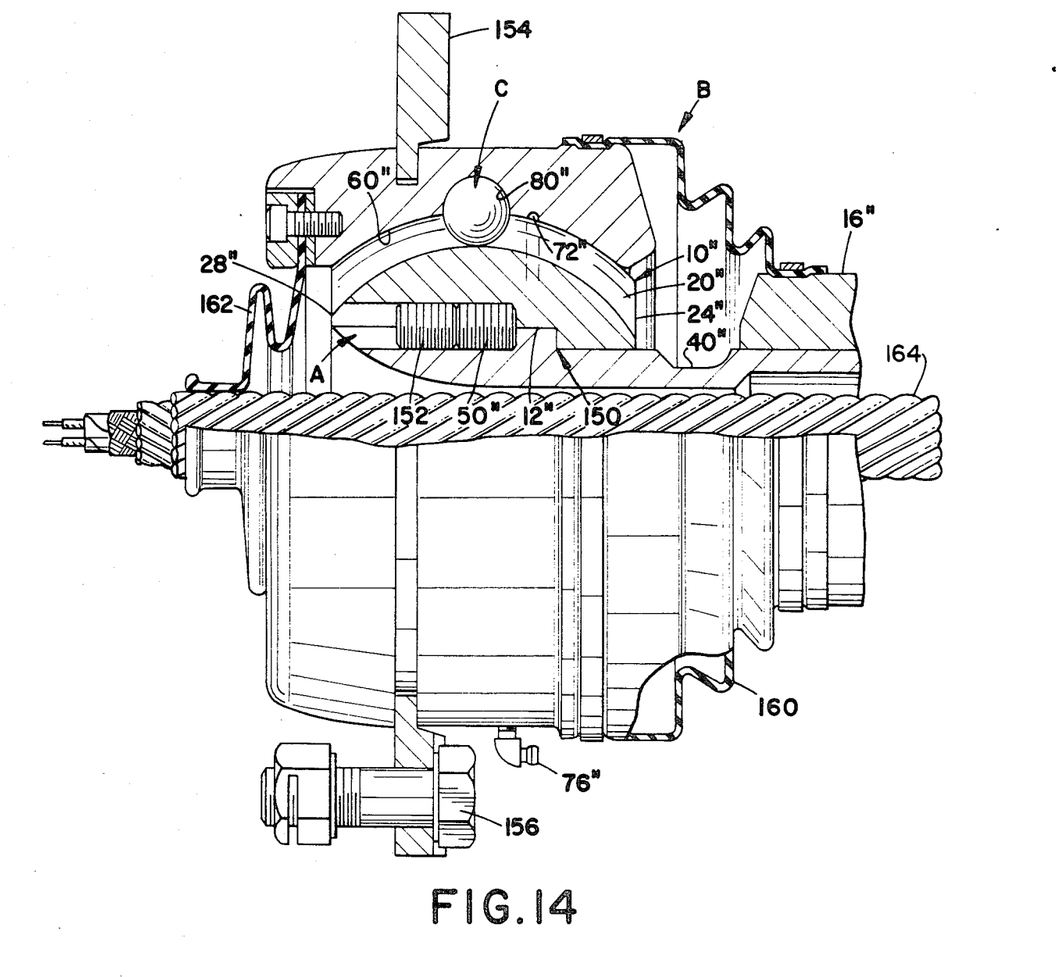

FIG. 14 shows yet another alternate embodiment of the present invention in which like elements are again identified by like numerals with a double primed (") suffix and new elements are identified by new numerals. Here, the ball member A has a spherical outer surface portion 10" with an axial bearing receiving slot 20". A first associated structure 16" is connected with an inner annular surface 12" of the ball member by interconnecting means which include mating annular shoulders 150 which are held firmly together by a set screw 50" and a locking screw 152. The housing B has a ball member receiving cavity with a spherical surface portion 60" and a bearing receiving recess 80". An annular flange 154 is adapted to receive mounting bolts 156 for securing the housing to a second associated structure. A front boot 160 and a rear boot 162 protect the joint construction from dirt and other contaminants. A cable 164 passes through the joint construction to the first associated structure 16".

The invention has been described with reference to preferred and alternative embodiments. Obviously, further modifications and alterations will become apparent to those of ordinary skill in the art upon a reading and understanding of this specification. It is intended to include all such modifications and alterations insofar as they come within the scope of the appended claims or the equivalents thereof.

Having thus described the invention, it is now claimed:

1. A cable termination joint construction for preventing relative axial rotation and permitting articulating movement between a cable and an associated structure, the construction comprising:

(a) a housing to be mounted to the associated structure, the housing including:

(i) an interior surface portion which lies substantially on the surface of a sphere, the spherical interior surface portion defining a generally spherical cavity therein;

(ii) a first access opening defining portion for defining a first access opening in communication with the spherical cavity;

(iii) a second access opening defining portion for defining a second access opening in communication with the spherical cavity, the first and second access openings being disposed on opposite sides of the spherical cavity;

(iv) the second access opening defining portion further defining an enlarged, ball receiving passage extending through the second access opening into the spherical cavity, the ball receiving passage having a first transverse dimension which is at least as great as the diameter of the spherical cavity and a second transverse dimension of different size generally orthogonal to the first transverse dimension;

(b) a toroidal ball member having an exterior surface portion which has a diameter that is less than the housing second access opening first transverse dimension and which is rotatably receivable in the housing spherical cavity, the ball member having generally parallel front and rear faces and defining an internal passage extending between the faces, the front and rear ball faces being separated by less than the housing second access opening second transverse dimension;

(c) one of the housing and ball member defining a first bearing receiving recess in communication with the housing spherical cavity and the other of the housing and ball member defining an axially extending first bearing receiving slot in communication with the housing spherical cavity and with the first bearing receiving recess;

(d) a first bearing disposed partially in said first recess and partially in said first slot, such that the slot, recess, and bearing restrict relative rotational movement between the ball member and the housing while allowing articulating movement therebetween;

(e) a hollow shaft operatively connected with the ball member and extending through the first access opening, the hollow shaft defining an interior passage in communication with the ball member internal passage;

(f) a cable termination device for receiving and anchoring a cable, the cable termination device being operatively connected with the hollow shaft, at least a portion of the cable passing from the cable termination device, through the shaft interior passage through the ball member internal passage, through the housing second access opening, and into the associated structure.

2. A cable termination construction for preventing relative axial rotation and permitting articulating movement between a cable and an associated structure, the cable termination construction comprising:
   (a) housing to be operatively connected with the associated structure, the housing including:
      (i) an interior surface portion which lies substantially on the surface of a sphere, the spherical interior surface portion defining a generally spherical cavity;
      (ii) a front access opening defining portion for defining a front access opening in communication with the spherical cavity;
      (iii) a rear access opening defining portion for defining a rear access opening in communication with the spherical cavity, the front and rear access openings being disposed on opposite sides of the spherical cavity;
   (iv) the rear access opening defining portion further defining an enlarged ball receiving passage extending therethrough into the spherical cavity, the ball receiving passage having a first transverse dimension which is at least as great as the diameter of the spherical cavity and a second transverse dimension of different size generally orthoganal to the first transverse dimension;
      (v) mounting means for selectively mounting the housing with the associated structure;
   (b) a toroidal ball member having an exterior surface portion which is rotatably receivable in the housing spherical cavity, the ball member having generally parallel front and rear faces and defining an internal passage extending between the faces, the front and rear ball faces being separated by less than the housing rear access opening second transverse dimension, the ball member further including mounting means for selectively mounting a cable termination device rigidly and nonrotatably therewith through the front access opening;
   (c) a cable clamped in the termination device and passing at least in part through the termination device through the ball member internal passage, through the rear access opening, and to the associated structure;
   (d) one of the housing and ball members defining a first bearing receiving recess in communication with the housing spherical cavity and the other of the housing and ball members defining an axially extending first bearing receiving slot in communication with the housing spherical cavity and with the first bearing receiving recess;
   (e) a bearing disposed partially in the bearing receiving recess and partially in the bearing receiving slot, such that the slot, recess, and bearing restrict relative rotational movement between the ball member and the housing while allowing articulating movement therebetween;
   (f) a first flexible boot operatively connected at a first end with the housing and operatively connected at a second end with the cable termination device; and,
   (g) a second flexible boot operatively connected at a first end with the housing adjacent the rear access opening and operatively connected at a second end with the cable.

* * * * *